US008099208B2

(12) United States Patent
Tauchi et al.

(10) Patent No.: US 8,099,208 B2
(45) Date of Patent: Jan. 17, 2012

(54) DRIVING DIAGNOSIS APPARATUS AND DRIVING DIAGNOSIS SYSTEM

(75) Inventors: Nobutaka Tauchi, Toyoake (JP); Tetsuya Oki, Nagoya (JP); Hiroaki Sekiyama, Tokyo (JP); Shojiro Takeuchi, Tokyo (JP)

(73) Assignees: DENSO CORPORATION, Kariya (JP); Toyota Jidosha Kabushiki Kaisha, Toyota (JP)

( * ) Notice: Subject to any disclaimer, the term of this patent is extended or adjusted under 35 U.S.C. 154(b) by 142 days.

(21) Appl. No.: 12/733,693

(22) PCT Filed: Jul. 29, 2009

(86) PCT No.: PCT/JP2009/003563

§ 371 (c)(1),
(2), (4) Date: Mar. 16, 2010

(87) PCT Pub. No.: WO2010/013454

PCT Pub. Date: Feb. 4, 2010

(65) Prior Publication Data

US 2010/0185359 A1 Jul. 22, 2010

(30) Foreign Application Priority Data

Aug. 1, 2008 (JP) ................................ 2008-200003

(51) Int. Cl.
*G06F 19/00* (2011.01)

(52) U.S. Cl. ........................................................ 701/33

(58) Field of Classification Search .............. 701/29–35, 701/123, 200–201
See application file for complete search history.

(56) References Cited

U.S. PATENT DOCUMENTS

| | | | |
|---|---|---|---|
| 7,130,766 B2 | 10/2006 | Tanase | |
| 2007/0282496 A1* | 12/2007 | Morimoto | 701/29 |
| 2009/0091439 A1 | 4/2009 | Sekiyama et al. | |

FOREIGN PATENT DOCUMENTS

| | | |
|---|---|---|
| JP | A-2000-74790 | 3/2000 |
| JP | A-2002-225586 | 8/2002 |
| JP | A-2002-230696 | 8/2002 |
| JP | A-2003-208696 | 7/2003 |
| JP | A-2004-171060 | 6/2004 |
| JP | A-2004-234260 | 8/2004 |
| JP | A-2005-195536 | 7/2005 |
| JP | A-2007-172487 | 7/2007 |

OTHER PUBLICATIONS

International Search Report and Written Opinion of the International Searching Authority mailed on Sep. 1, 2009 for the corresponding international patent application No. PCT/JP2009/003563 (English translation enclosed).

* cited by examiner

*Primary Examiner* — Mary Cheung
(74) *Attorney, Agent, or Firm* — Posz Law Group, PLC

(57) ABSTRACT

A driving diagnosis apparatus temporarily records a diagnosis result of the user before changed when a user is switched, and starts to diagnose the user after changed. Accordingly, since driving status of each user is independently diagnosed, the diagnosis result is proper. Further, when a driving distance of the vehicle is smaller than a threshold, the diagnosis result of a driving interval is not recorded so that the driving interval is removed from an object of giving a point. Influence to environment is also considered in evaluation of the driving status. Accordingly, in the driving diagnosis apparatus and a driving diagnosis system for diagnosing driving status and for evaluating a driver based on the diagnosis result, the diagnosis and the evaluation are properly performed.

6 Claims, 9 Drawing Sheets

DRIVING DIAGNOSIS APPARATUS AND DRIVING DIAGNOSIS SYSTEM

CROSS REFERENCE TO RELATED APPLICATIONS

This application is a U.S. national stage application of PCT/JP2009/003563 filed on Jul. 29, 2009 and is based on Japanese Patent Application No. 2008-200003 filed on Aug. 1, 2008, the disclosure of which is incorporated herein by reference.

TECHNICAL FIELD

The present invention relates to a driving diagnosis device for diagnosing a driving status of a vehicle and a driving diagnosis system for diagnosing a driving status of a vehicle.

BACKGROUND ART

Recently, a problem about environment such as environmental pollution and global warming has been raised largely. For example, regarding a vehicle (i.e., an automotive vehicle), reduction of an emission gas such as carbon dioxide gas is one of main objects.

Further, regarding a vehicle, an object related to safety has been raised largely since traffic accidents have been increased.

In view of the above points, intelligence technology for vehicles and high performance technology for vehicles have advanced in order to improve measures related to the environmental problems (such as fuel consumption rate) and measures related to safety. A certain result has been achieved.

When an individual driver tries to drive a vehicle economically and safety, improvement of a fuel consumption rate (and reduction of emission gas) and reduction of traffic accidents may be expected. Thus, it is one of important issues to improve driving skills of each driver. Thus, many methods for promoting economy driving and safe driving of a driver have been proposed (for example, in the patent document No. 1: JP-A-2002-230696).

The patent document No. 1 teaches a technique for providing benefits to a driver who drives a vehicle safety. Specifically, the patent document No. 1 teaches the technique for determining driving status of the vehicle and for giving an beneficial point according to determination results. When the driver drives the vehicle safety, he gets points in accordance with a degree of safety driving. Further, the patent document No. 1 teaches service for utilizing points with various payments, the points earned by the driver.

Here, in view of measures for environment, it is preferable to limit usage of the vehicle. When points are given to the driver who drives the vehicle safety, the driver may consider using the vehicle even in case of a very short distance transfer. When the vehicle is used for the very short distance transfer, it is not preferable for the environment. In this point, it is preferable to perform diagnosis (i.e., to perform a point providing method) in view of influence to the environment.

Further, as another problem, conventionally, it is not considered to diagnose driving status in each owner of a vehicle when the vehicle is owned by multiple persons commonly. For example, the driving status of all owners is diagnosed as a whole.

PRIOR ART DOCUMENT

Patent Document

Patent document No. 1: JP-A-2002-230696

DISCLOSURE OF THE INVENTION

In view of the above-described problem, it is an object of the present disclosure to provide a driving diagnosis apparatus and a driving diagnosis system for diagnosing driving status and evaluating the driving status in accordance with diagnosis results, and to provide appropriate diagnosis and evaluation.

According to a first aspect of the present disclosure, a driving diagnosis apparatus for vehicles includes: an obtaining means for obtaining vehicle information that represents a vehicle condition; a diagnosing means for diagnosing driving status of the vehicle based on the vehicle information when the vehicle runs; a diagnosis result recording means for recording a diagnosis result of the diagnosing means; a calculating means for calculating a point to be given to a driver based on the diagnosis result; a calculation result recording means for recording a calculation result of the calculating means; a registering means for registering an user; a selecting and switching means for selecting and switching the user among registered users at least in the registering means; and a driving distance determining means for determining whether a driving distance during first to fourth trip periods in an on-off term is equal to or larger than, a predetermined threshold. The on-off term is defined as a period from time at which an accessory switch of the vehicle turns on to time at which the switch turns off. The first trip period is defined as a period from time at which the accessory switch turns on to time at which the switch turns off when the user is not switched in the on-off term. The second trip period is defined as a period from user switching time to next user switching time when the user is switched twice or more in the on-off term. The third trip period is defined as a period from time at which the accessory switch turns on to first user switching time when the user is switched in the on-off term. The fourth trip period is defined as a period from last user switching time to time at which the accessory switch turns off when the user is switched in the on-off term. The diagnosis result recording means records the diagnosis result during one of the first to fourth trip periods in each user who is selected or switched by the selecting and switching means when the determining means determines in a determination process that the driving distance during the one of the first to fourth trip periods is equal to or larger than the threshold. The diagnosis result recording means does not record the diagnosis result during one of the first to fourth trip periods when the determining means determines in the determination process that the driving distance during the one of the first to fourth trip periods is not equal to or larger than the threshold. The calculation result recording means records the point as the calculation result of the calculating means in each user who is selected or switched by the selecting and switching means.

In the above apparatus, the point is given (i.e., the point is accumulated) to each user in accordance with the diagnosis result. Thus, the driving diagnosis apparatus provides to handle multiple users. Further, the apparatus provides to restrict usage of the vehicle when a user uses the vehicle for a very short distance transfer in order to get the point. Thus, the apparatus prevents promotion of needless usage of the vehicle.

According to a second aspect of the present disclosure, a driving diagnosis system includes: an in-vehicle apparatus mounted on a vehicle; and a server configured to communicate with the in-vehicle apparatus. The in-vehicle apparatus includes: an obtaining means for obtaining vehicle information that represents a vehicle condition; a diagnosing means for diagnosing driving status of the vehicle based on the vehicle information when the vehicle runs; a diagnosis result recording means for recording a diagnosis result of the diagnosing means; and an in-vehicle apparatus side transmitting means for transmitting information about the diagnosis result recorded by the diagnosis result recording means to the server. The server includes: a calculating means for calculating a point to be given to a driver based on the information about the diagnosis result received from the in-vehicle apparatus; a calculation result recording means for recording a calculation result of the calculating means as the point; and a server side transmitting means for transmitting information about the calculation result recorded by the calculation result recording means to the in-vehicle apparatus. The in-vehicle apparatus further includes: a registering means for registering an user; a selecting and switching means for selecting and switching the user among registered users at least in the registering means; and a driving distance determining means for determining whether a driving distance during first to fourth trip periods in an on-off term is equal to or larger than a predetermined threshold. The on-off term is defined as a period from time at which an accessory switch of the vehicle turns on to time at which the switch turns off. The first trip period is defined as a period from time at which the accessory switch turns on to time at which the switch turns off when the user is not switched in the on-off term. The second trip period is defined as a period from time of user switching opportunity to time of following user switching opportunity when the user is switched twice or more in the on-off term. The third trip period is defined as a period from time at which the accessory switch turns on to time of first user switching opportunity when the user is switched in the on-off term. The fourth trip period is defined as a period from time of last user switching opportunity to time at which the accessory switch turns off when the user is switched in the on-off term. The diagnosis result recording means records the diagnosis result during one of the trip periods in each user who is selected or switched by the selecting and switching means when the determining means determines in a determination process that the driving distance during the one of the trip periods is equal to or larger than the threshold. The diagnosis result recording means does not record the diagnosis result during one of the trip periods when the determining means determines in the determination process that the driving distance during the one of the trip periods is not equal to or larger than the threshold. The calculation result recording means records the point as the calculation result of the calculating means in each user who is selected or switched by the selecting and switching means.

In the above driving diagnosis system, the diagnosis of the driving status is performed in each user. Further, the point is given (i.e., the point is accumulated) to each user in accordance with the diagnosis result. Thus, the driving diagnosis system provides to handle multiple users. Further, the system provides to restrict usage of the vehicle when a user uses the vehicle for a very short distance transfer in order to get the point. Thus, the system prevents promotion of needless usage of the vehicle.

BRIEF DESCRIPTION OF THE DRAWINGS

The above and other aspects, features and advantages of the present invention will become more apparent from the following detailed description made with reference to the accompanying drawings. In the drawings.

PREFERRED EMBODIMENTS FOR CARRYING OUT THE INVENTION

An embodiment of the present invention will be explained with reference to drawings as follows.

Figure 1:
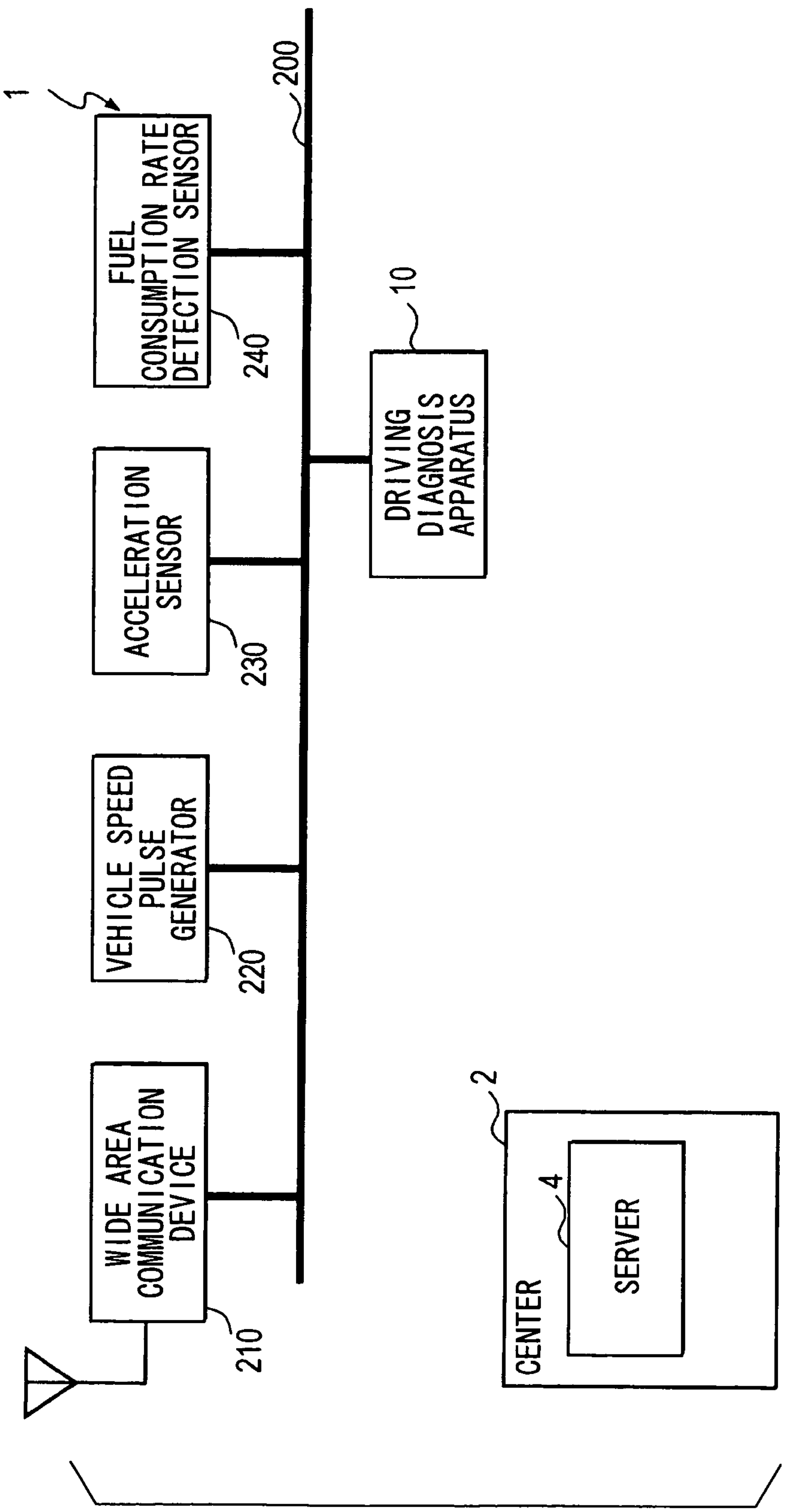
FIG. 1 is a schematic diagram showing a driving diagnosis system according to an embodiment.

FIG. 1 shows a construction of a driving diagnosis system 1 according to the embodiment of the present invention. The driving diagnosis system 1 mainly includes a driving diagnosis apparatus 10 mounted on a vehicle (not shown) and a server 4 mounted in a center 2.

The driving diagnosis apparatus 10 is coupled with an in-vehicle LAN 200. Further, the in-vehicle LAN 200 is connected to, for example, a wide area communication device 210, a vehicle speed pulse generator 220, an acceleration sensor 230 and a fuel consumption rate detection sensor 240. Here, the sensors 230, 240 are one example, and thereby, various sensors for detecting a condition of the vehicle are coupled with the in-vehicle LAN 200.

The wide area communication device 210 is configured to communicate with the server 4. Further, the device 210 is configured to receive traffic information (such as traffic accident information and traffic jam information) from a VICS (registered trademark, vehicle information and communication system, i.e., road and traffic information system) center and to transmit vehicle information and user information to the VICS center via an electric wave beacon and/or an optical beacon for VICS service, which are arranged along with a road, for example.

The vehicle speed pulse generator 220 is a device for generating a pulse signal according to a vehicle speed.

The acceleration sensor 230 is a sensor for outputting a signal corresponding to acceleration of the vehicle.

The fuel consumption rate detection sensor 240 is a sensor for outputting a signal corresponding to fuel consumption in a fuel tank.

Figure 2:
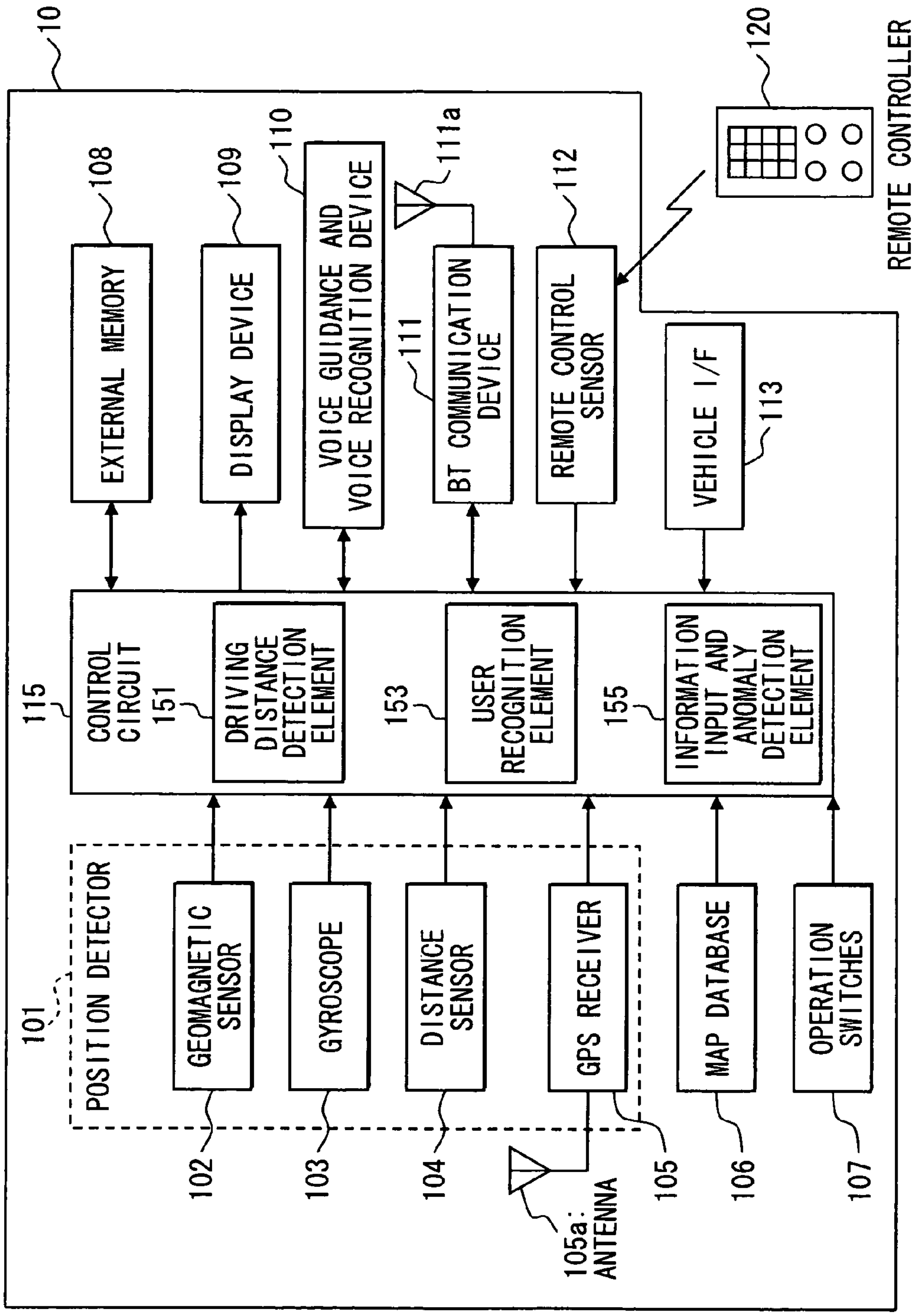
FIG. 2 is a block diagram showing a construction of a driving diagnosis apparatus.

FIG. 2 is a block diagram showing a specific structure for the driving diagnosis apparatus 10.

The driving diagnosis apparatus 10 includes a position detector 101, a map database 106, operation switches 107, an external memory 108, a display device 109, a voice guidance and voice recognition device 110, a Bluetooth communication device (i.e., BT communication device) 111, a remote control sensor 112, a vehicle interface (i.e., I/F) 113 and a control circuit 115 for controlling them.

The position detector 101 is a group of sensors for detecting a current position and a direction (i.e., a driving direction) of the vehicle, on which the driving diagnosis apparatus 10 is mounted. The position detector 101 includes a geomagnetic sensor 102, a gyroscope 103, a distance sensor 104 and a GPS receiver 105.

The GPS receiver 105 receives a transmission electric wave from an artificial satellite for a GPS (global positioning system) via a GPS antenna 105*a* so that the receiver 105 detects a position, a direction (i.e., a driving direction), a speed and like of the vehicle.

The geomagnetic sensor 102 is a direction sensor formed from semiconductor. The sensor 102 detects geomagnetic field of north/south poles in the earth so that the sensor 102 detects a direction (i.e., a driving direction).

The gyroscope 103 is a sensor for detecting an angular speed (i.e., amount of change of the direction) of the vehicle. The gyroscope 103 outputs a detection signal corresponding to the angular speed of rotational movement applied to the vehicle.

The distance sensor 104 detects a traveling distance based on the acceleration and the like along with a front and rear direction of the vehicle.

Since the above sensors have various errors with different characteristics, respectively, multiple sensors compensate with each other.

The map database 106 stores map data. The map data 106 is, for example, a link data representing a road, a node data representing an intersection, a map matching data for improving accuracy of specifying a position, a mark data representing facilities, an image data for display, and a voice data for voice guidance.

The operation switches 107 are integrated with the display device 109. The switches 107 are an input operation panel including a touch panel mounted on a display screen and mechanical button switches arranged around the display device 109. The touch panel is integrated with the display device 109 so that they provide a multi-layered structure. The touch panel is, for example, a pressure sensitive panel, an electro-magnetic induction panel, a capacitance panel, or a combination type panel having a combination of these panels.

The external memory 108 stores various programs to be executed by the control circuit 115, calculation result in the control circuit 115, and the like.

The display device 109 is a liquid crystal color display for displaying a button functioning as a touch panel that is integrated with the operation switches 107, diagnosis results of a driving condition, a map, a searched road, a television programs, a DVD programs and other images on a screen.

The voice guidance and voice recognition device 110 outputs voice message of route guide so that the device 110 performs voice guidance. Further, the device 110 converts voice, which is input from a user via a microphone not shown in FIG. 2, to an electric signal. Then, the device 110 checks the voice with vocabulary data (i.e., a comparison object pattern) in a recognition dictionary stored in the device 110, and then, outputs the most highest coincidence degree data as a recognition result to the control circuit 115.

The BT communication device 111 is a device for communicating with periphery devices without wire (i.e., with Blue tooth communication method).

The remote control sensor 112 receives a wireless signal such as an infrared light signal and an electric wave signal from a remote controller 120, which is operated by a user. Then, the sensor 112 inputs a reception result into the control circuit 115. The user operates the remote controller 120 so that the user can operate the operation switches 107 at a position distant from the switches 107.

The I/F 113 receives signals from various sensors (such as the vehicle speed pulse generator 220, the acceleration sensor 230, the fuel consumption rate detection sensor 240 in FIG. 1) mounted on the vehicle, and inputs the signals into the control circuit 115. Other sensors such as an accelerator sensor, a throttle opening degree sensor, a brake sensor, a steering wheel sensor, an inter-vehicular distance sensor, an image sensor, a direction indicator sensor, and an illuminance sensor are mounted on the vehicle.

The control circuit 115 includes a driving distance detection element 151, a user recognition element 153 and an information input and anomaly detection element 155.

The driving distance detection element 151 detects a driving distance of the vehicle.

The user recognition element 153 recognizes (i.e., certificates) the user (i.e., the driver).

The information input and anomaly detection element 155 detects anomaly about information input into the control circuit 115. Specifically, the element 155 determines whether the vehicle information (for example, signals from various sensors) is correctly input into the control circuit 115.

Figure 3:
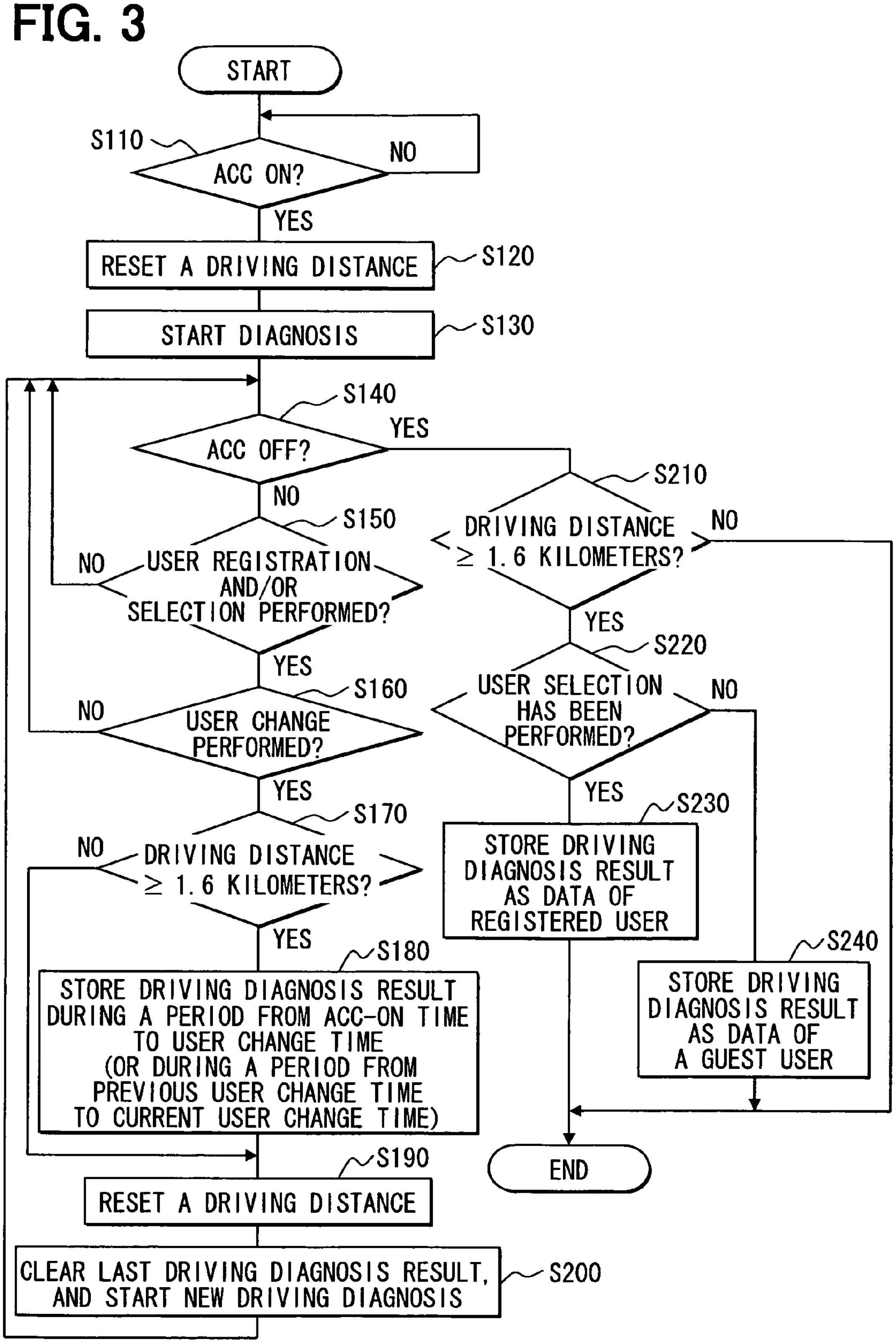
FIG. 3 is a flowchart showing a diagnosis result recording process executed by a control circuit.

FIG. 3 is a flowchart showing a diagnosis result recording process executed by the control circuit 115.

The diagnosis result recording process in FIG. 3 is executed periodically after the driving diagnosis apparatus 10 is activated. In Step S110, the circuit 115 determines whether an accessory switch (i.e., ACC) of the vehicle turns on. When the circuit 115 determines that the accessory switch does not turn on (i.e., when the determination in step S110 is "NO"), the circuit 115 repeats step S110.

When the circuit 115 determines that the accessory switch turns on (i.e., when the determination in step S110 is "YES"), it goes to step S120. In step S120, the circuit 115 resets (i.e., clear) information about a driving distance stored in the external memory 108 of the driving diagnosis apparatus 10.

Next, it proceeds to step S130, and the circuit 115 starts diagnosis of the driving status.

Components of diagnosis are, for example, diagnosis for driving and turning on an ecology lamp, diagnosis for driving and using an ecology switch (i.e., ECO SW), diagnosis for using air conditioner, and diagnosis for driving and releasing, an accelerator. Here, ecology lamp is a lamp that turns on when the driving conditions of the vehicle are in an economical state (for example, in a state at which a fuel consumption is minimized). Further, the ECO SW is a switch for switching a driving mode of the vehicle to be a low fuel consumption mode. In the low fuel consumption mode, for example, an operation status of an air conditioner is decreased, compared with a normal mode, and/or an increasing rate of a fuel injection amount with respect to a pressing degree of an accelerator is decreased, compared with the normal mode, so that the fuel consumption is reduced.

In the diagnosis for driving and turning on an ecology lamp, a ratio between a driving distance of the vehicle that runs under a condition where the ecology lamp turns on and a predetermined driving interval (i.e., a predetermined driving distance) is calculated (i.e., a ratio of the driving distance of the vehicle that runs economically is calculated).

In the diagnosis for driving and using an ecology switch, a ratio between a driving distance of the vehicle that runs under a condition where the ECO SW is active and a predetermined driving interval (i.e., a predetermined driving distance) is calculated (i.e., a ratio of the driving distance of the vehicle that runs under the low fuel consumption mode is calculated).

In the diagnosis for using air conditioner, a ratio between an operating time of the air conditioner and time of the vehicle capable of running in a predetermined driving interval (i.e., a predetermined driving distance) is calculated.

In the diagnosis for driving and releasing an accelerator, a ratio of the driving distance of the vehicle that runs under a condition where the accelerator is released (i.e., a pressing degree of the accelerator is zero) and a predetermined driving interval (i.e., a predetermined driving distance) is calculated.

After step S130, it proceeds to step S140. In step S140, the circuit 115 determines whether the accessory switch turns off. When the circuit 115 determines that the accessory switch does not turn off (i.e., when the determination of step S140 is "NO"), it proceeds to step S150.

In step S150, the circuit 115 determines, whether user registration (or user selection) is performed.

Here, when the driving diagnosis apparatus 10 is activated, an image for promoting the user registration is displayed on a display screen of the display device 109. The user (i.e., the driver) can register the user name through the image for promoting the user registration. Further, the user (i.e., the driver) always registers the user name at any time when the user selects a "user registration" menu, which is displayed on the display screen. Furthermore, the user (i.e., the driver) can register user information, which is grouped. For example, the user information about a family may be grouped into a "family" group, and then, registered. The user information about a friend and an acquaintance may be grouped into a "friend" group, and then, registered.

In case of the user selection, the user (i.e., the driver) selects a "user selection" menu, which is displayed on the display screen. The user selects certain user information in a displayed list of the user information.

When the circuit 115 determines in step S150 that the user registration (or the user selection) is not performed, (i.e., when the determination of S150 is "NO"), it returns to step S140.

When the circuit 115 determines in step S150 that the user registration (or the user selection) is performed, (i.e., when the determination of S150 is "YES"), it proceeds to step S160. In step S160, the circuit 115 determines whether user change (i.e., user switch) is performed. The user (i.e., the driver) selects a "user switch" menu, which is displayed on the display screen, so that the user selects certain user information in a displayed list of the user information. Thus, the user can be switched.

When the circuit 115 determines in step S160 that the user change (or the user switch) is not performed, (i.e., when the determination in S160 is "NO"), it returns to step S140.

When the circuit 115 determines in step S160 that the user change (or the user switch) is performed, (i.e., when the determination in S160 is "YES"), it proceeds to step S170.

In step S170, the circuit 115 determines whether the driving distance during a period from time at which the accessory switch turns on to time at which the user is changed (i.e., switched) (i.e., a period from step S110 to step S160) is equal to or larger than 1.6 kilometers. The driving distance is calculated by the driving distance detection element 151 (in FIG. 2). Here, the distance of 1.6 kilometers is an average driving distance (which is determined statistically) when the driver performs a short distance drive (i.e., when the driver drives the vehicle for a short distance errand.

The driving distance detection element 151 calculates the driving distance in a term, in which the vehicle information is correctly obtained, during the period from step S110 to step S160.

The information input and anomaly detection element 155 (in FIG. 2) determines whether the vehicle information is correctly obtained. Specifically, the information input and anomaly detection element 155 determines whether normal signals are input from the vehicle speed pulse generator 220, the acceleration sensor 230 and the fuel consumption detection sensor 240 via the vehicle I/F 113 so that the information input and anomaly detection element 155 determines whether the vehicle information is correctly obtained.

In step S170, the circuit 115 determines whether the driving distance in a term other than a term, in which the vehicle information is not correctly obtained, during the period from step S110 to step S160 is equal to or larger than 1.6 kilometers, (i.e., whether the driving distance in a term in which the vehicle information is correctly obtained is equal to or larger than 1.6 kilometers).

In step S170, when the circuit 115 determines that the driving distance (i.e., the driving distance in a period from step S110 to step S160) is not equal to or larger than 160° C., (i.e., when the determination of Step S170 is "NO," it proceeds to step S190.

In step S170, when the circuit 115 determines that the driving distance (i.e., the driving distance in a period from step S110 to step S160) is equal to or larger than 1.6 kilometers (i.e., when the determination of Step S170 is "YES," it proceeds to step S180.

In step S180, the diagnosis result of the driving status during the period from time at which the accessory switch turns on to time at which the user is changed (i.e., switched) (i.e., during the period from step S110 to step S160) is stored in the external memory 108. Here, the diagnosis of the driving status is performed in the term in which the vehicle information is correctly obtained. The diagnosis is not performed in the term in which the vehicle information is not correctly obtained. This is because the normal diagnosis cannot be performed in the term in which the vehicle information is not correctly obtained.

In step S180, the diagnosis result is stored in the external memory so as to connect to the user before changing (i.e., switching). The diagnosis result stored in the external memory 108 is transmitted to the server (in FIG. 1) via the wide area communication device 210. (This transmitting process corresponds to an in-vehicle side transmitting means.)

Here, when the server 4 receives the diagnosis result from the driving diagnosis apparatus 10, the server 4 calculates a point to be given to the driver of the vehicle based on the diagnosis result. When the diagnosis result is excellent, the point to be given is large. Specifically, when the driving status shows high economical performance such as excellent fuel consumption, or when the driving status shows high safety performance (i.e., when the driving status shows high degree of safety drive), the point to be given is large. The server 4 updates the accumulated points in each driver according to the calculated point. Then, the server 4 compares the accumulated points of all drivers so that the server 4 calculates a ranking of the drivers. The ranking is calculated at certain time intervals such as day by day, month by month, or year by year. The point (which is to be given to the driver) calculated based on the diagnosis result and the accumulated points are stored in a memory device (not shown) as a calculation result recording means in the server 4. The information about the points and the information about the accumulated points stored in the memory device are transmitted to the driving diagnosis apparatus 10. (This transmitting process corresponds to the server side transmitting means.)

After step S180, it proceeds to step S190. In step S190, the driving distance is reset (cleared). Then, it proceeds to step S200.

In step S200, the circuit, 115 starts diagnosis relating to the driving status with respect to a new user after changed (i.e., switched). Then, it returns to step S140.

In step S140, when the circuit 115 determines that the accessory switch turns off, (i.e., when the determination of step S140 is "YES"), it proceeds to step S210. In step S210, the circuit 115 determines whether the driving distance in a period from time at which the accessory switch turns on to time at which the accessory switch turns off (i.e., a period from step S110 o step S140) is equal to or larger than 1.6 kilometers.

When the circuit 115 determines in step S210 that the driving distance (i.e., the driving distance in the period from step S110 to step S140) is not equal to or larger than 1.6 kilometers, (i.e., when the determination of step S210 is "NO"), the process ends.

When the circuit 115 determines in step S210 that the driving distance (i.e., the driving distance in the period from step S110 to step S140) is equal to or larger than 1.6 kilometers, (i.e., when the determination of step S210 is "YES"), it proceeds to step S220. in step S220, the circuit 115 determines whether the user selection has been performed already. Specifically, the circuit 115 determines whether the driving diagnosis is performed under a condition that the user has been selected, or the driving diagnosis is performed under a condition that the user has not been selected.

When the circuit 115 determines in step S220 that the user selection has been performed, (i.e., when the determination of step S220 is "YES"), it proceeds to step S230. In step S230, the diagnosis result is stored in the external memory 108 so as to connect to the user, which has been selected already. Then, the process ends.

Here, for example, handling of a case where a term, in which the user selection (i.e., identification) is not performed, exists in the period from time at which the accessory switch turns on to time at which the user is selected will be explained with reference to FIG. 6.

Figure 6:
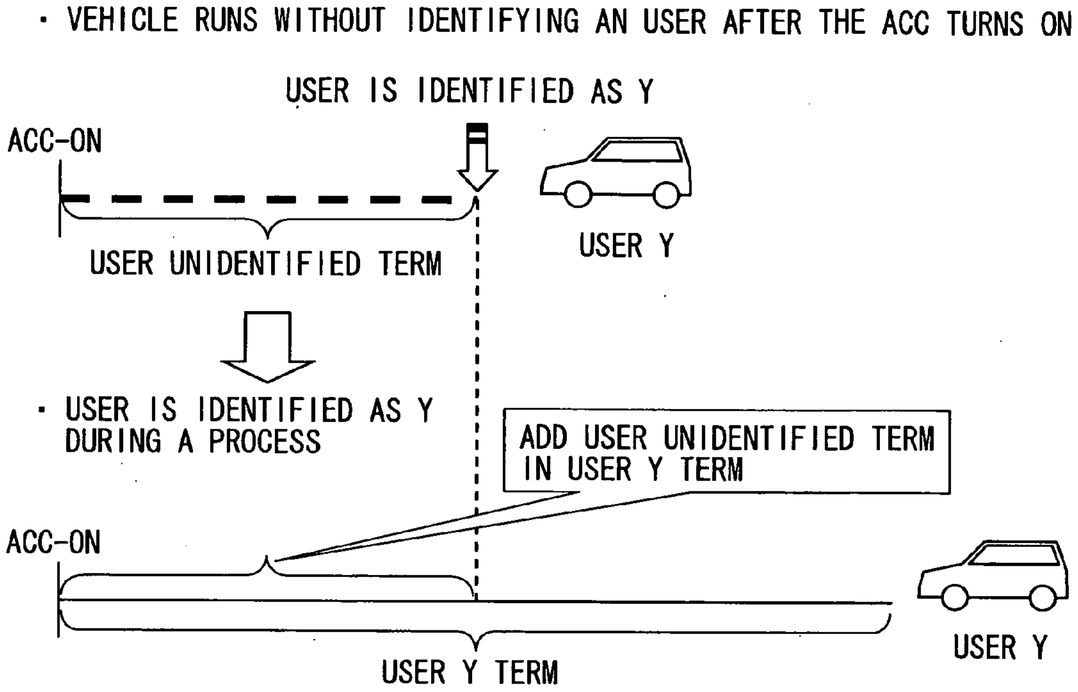
FIG. 6 is a diagram showing one example of a processing case of the embodiment.

FIG. 6 shows a situation that the user is not selected (i.e., identified) during a period from time at which the accessory switch of the vehicle turns on to predetermined time elapsed, and then, the user Y is selected (i.e., identified). Here, it is assumed that the vehicle does not stop during the period. Here, the term in which the user is not selected (i.e., identified) is defined as a user unidentified term.

In this case, as shown in FIG. 6, the user unidentified term is deemed to be a part of the user Y term. Thus, the diagnosis result in the user unidentified term is deemed to be a part of the diagnosis result of the user Y. This is because there is a high possibility that a driving person in the user unidentified term is the user Y, which is selected (i.e., identified) latter.

The explanation will be back to FIG. 3. When the circuit 115 determines in step S220 that the user selection has not been performed yet (i.e., when the determination of step S220 is "YES"), it proceeds to step S240. In step S240, the diagnosis result is stored as data corresponding to a guest user in the external memory 108. This means that the diagnosis result is stored as a tentative user data. After step S240, the process ends.

Here, the information of the diagnosis result of the guest user may be sorted to other user information, deleted, or processed variously. These processes will be explained with reference to FIG. 7. Here, the information of the diagnosis result of the guest user is defined as guest information.

Figure 7:
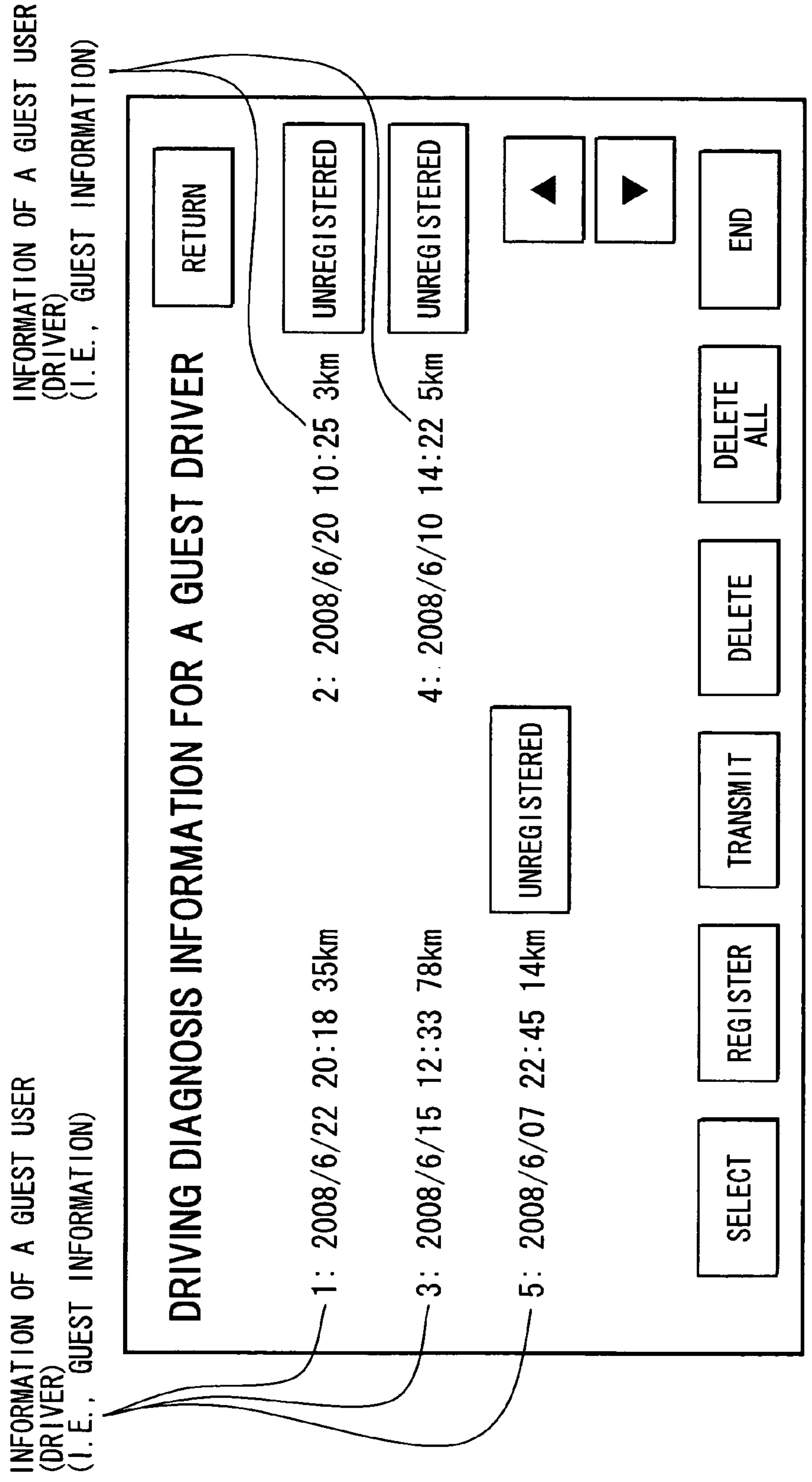
FIG. 7 is a diagram showing one example of a screen interface.

As shown in FIG. 7, the guest information is displayed as a list on the display screen, based on the input of the user (i.e., the driver).

In FIG. 7, a "select" button is a button for selecting guest information to be registered, transferred or deleted. After the "select" button is pushed, the guest information item is pushed so that a color of an image of the guest information item is changed. Thus, the user can recognize that the item is selected. When an "end" button is pushed, the selection is completed (i.e., fixed).

A "register" button is a button for displacing (i.e., sorting) the guest information to other user information. After the selection of the guest information is performed, when the "register" button is pushed, a data transfer destination (i.e., data sort destination) can be assigned.

A "transmit" button is a button for transmitting the guest information to the server 4. After selection of the guest information is performed, when the "transmit" button is pushed, the guest information, which has been selected already, is transmitted to the server 4. Here, regarding the guest information, which is indicated as an unregistered item, it is necessary to resister the user or to certificate the user when the information is transmitted to the server 4.

A "delete" button is a button for deleting the guest information. When the guest information is selected, and the "delete" button is pushed, the selected guest information is deleted.

When a, "delete all" button is pushed, all of the guest information is deleted.

Figure 4:
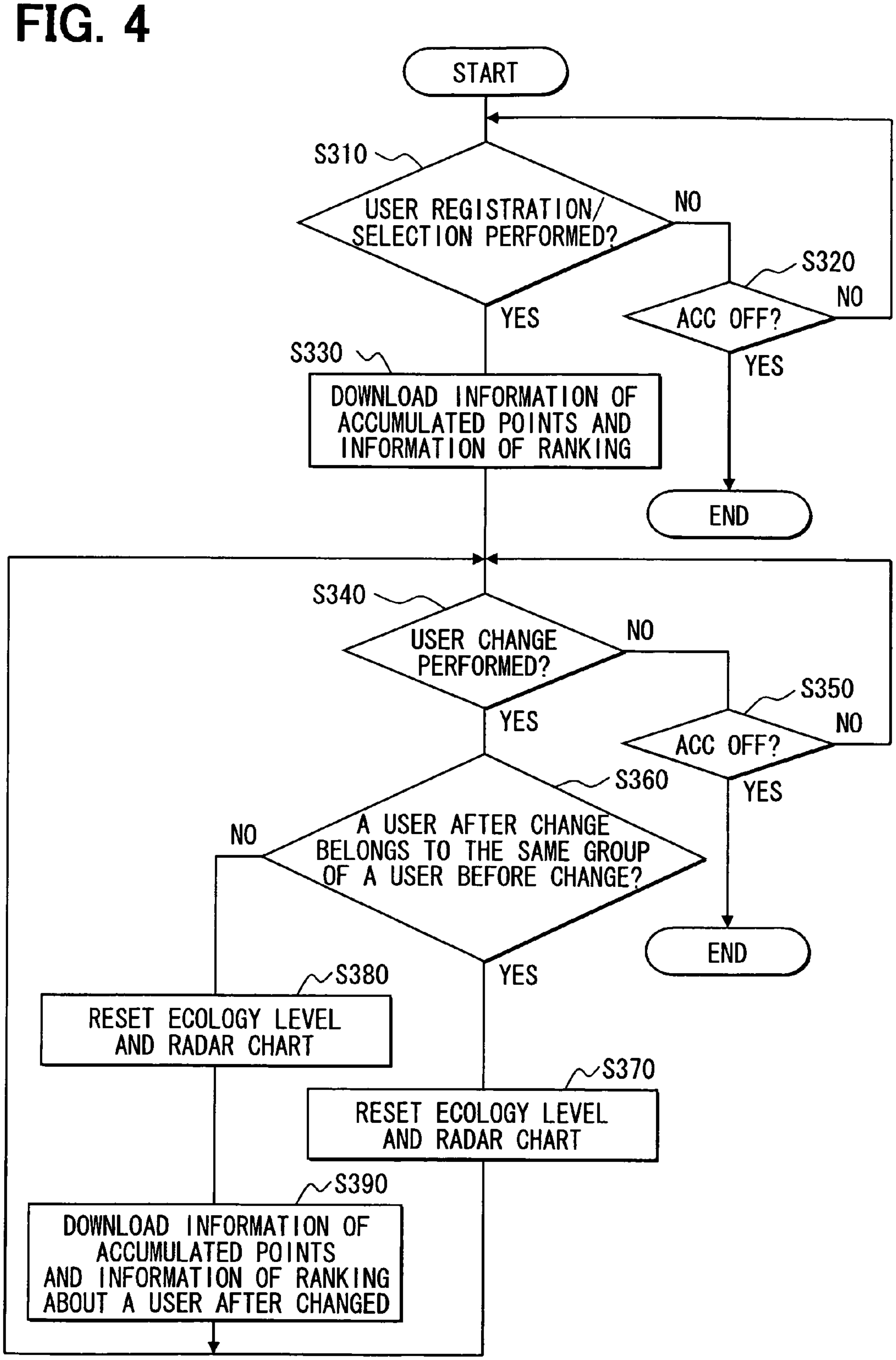
FIG. 4 is a flowchart showing a point display controlling process executed by the control circuit.

Next, FIG. 4 is a flowchart showing a point display control process, which is executed by the control circuit 115.

The process in FIG. 4 is executed periodically after the driving diagnosis apparatus 10 is activated. First, in step S310, the circuit 115 determines whether user registration is performed (i.e., whether user selection is performed).

When the circuit 115 determines in step S310 that the user registration is not performed yet (i.e., the user selection is not performed yet) (i.e., when the determination of step S310 is "NO"), it proceeds to step S320. In step S320, the circuit 115 determines whether the accessory switch turns off.

When the circuit 115 determines that the accessory switch turns off (i.e., when the determination of step S320 is "YES"), the process ends.

When the circuit 115 determines that the accessory switch does not turn off (i.e., when the determination of step S320 is "NO"), it returns to step S310.

When the circuit 115 determines that the user registration is performed (or the user selection is performed) (i.e., when the determination of step S310 is "YES"), it proceeds to step S330. In step S330, the information about the accumulated points of the user and the information about the ranking are downloaded from the server 4.

After step S330, it proceeds to step S340. In step S340, the circuit 115 determines whether user change (i.e., user switch) is performed. When the circuit 115 determines that the user change (user switch) is not performed (i.e., when the determination of step S340 is "NO"), it proceeds to step S350.

In step S350, the circuit 115 determines whether the accessory switch turns off. When the circuit 115 determines that the accessory switch turns off (i.e., when the determination of step S350 is "YES"), the process ends.

When the circuit 115 determines in step S350 that the accessory switch does not turn off (i.e., when the determination of step S350 is "NO"), it returns to step S340.

When the circuit 115 determines in step S340 that the user change (i.e., user switch) is performed (i.e. when the determination of step S340 is "YES"), it proceeds to step S360. In step S360, the circuit 115 determines whether the user after change (switch) belongs to the same group as the user before change (switch).

When the circuit 115 determines in step S360 that the user after change belongs to the same group as the user before change, (i.e., when the determination of step S360 is "YES"), it proceeds to step S370. In step S370, the display image regarding the diagnosis of an ecology level and a radar chart is reset (i.e., cleared), and then, the circuit 115 starts the diagnosis again. A new diagnosis result is newly displayed on the display device 109. After step S370, it returns to step S340.

When the circuit 115 determines in step S360 that the user after change does not belong to the same group as the user before change, (i.e., when the determination of step S360 is "NO"), it proceeds to step S380. In step S380, the display image regarding the diagnosis of an ecology level and a radar chart is reset (i.e., cleared), and then, the circuit 115 newly starts the diagnosis.

Next, it proceeds to step S390. In step S390, the information of the accumulated points and the information of the ranking about the user after changed (i.e., switched) is downloaded again from the server 4. The downloaded information is displayed on the display screen of the display device 109.

Figure 5:
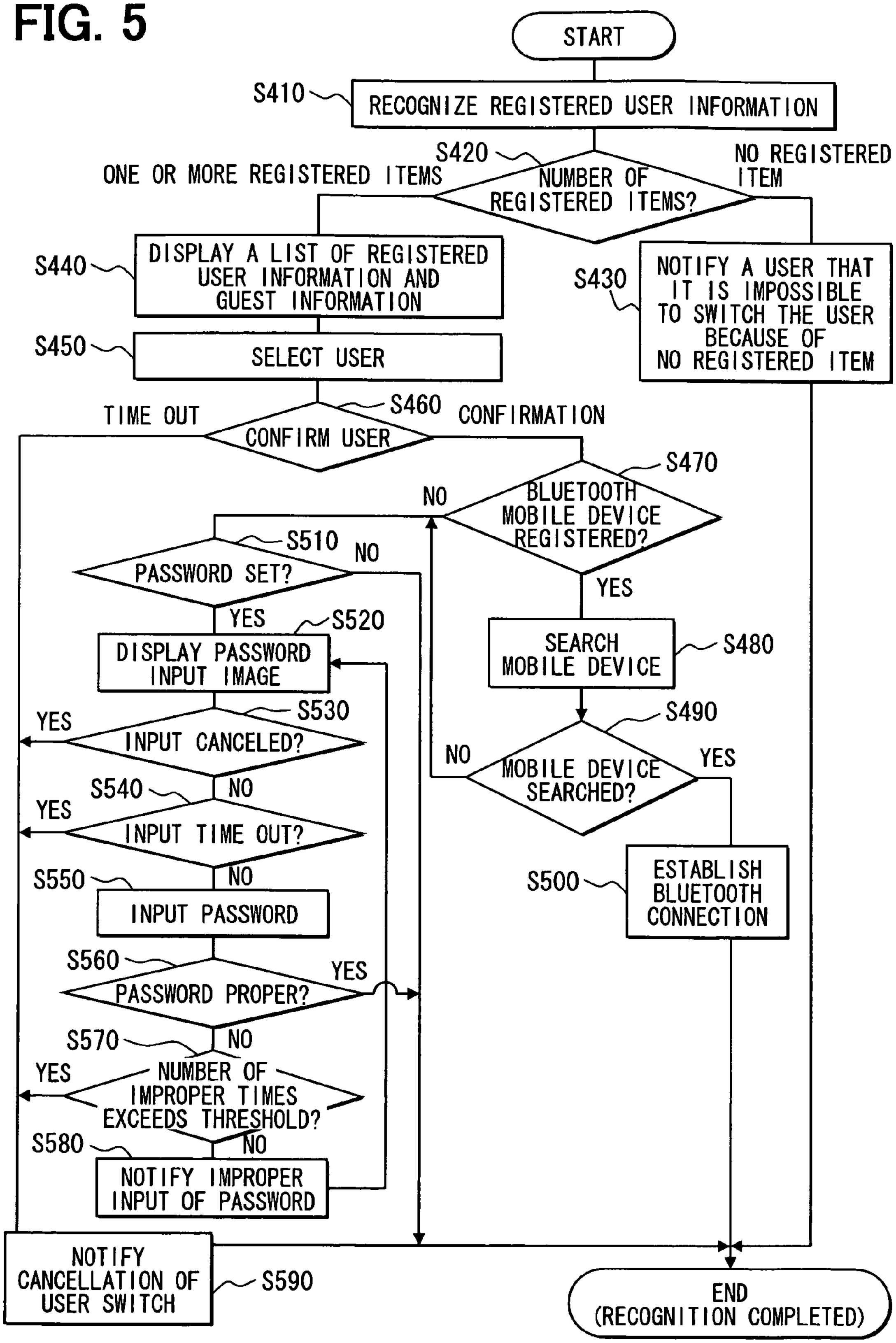
FIG. 5 is a flowchart showing a user recognizing and switching process executed by the control circuit (as a user recognition element)

FIG. 5 is a flowchart showing a user recognition/switching process, which is executed by the control circuit 115 (specifically, by the user recognition element 153).

The circuit 115 starts the user recognition/switching process in FIG. 5 when the user (i.e., the driver) inputs an instruction for switching the user. First, in step S410, the circuit 115 recognizes the registered user information of the driving diagnosis apparatus 10.

Next, it proceeds to step S420. In step S420, the circuit 115 calculates the number of items of the registered user information, and then, when the circuit 115 determines based on the calculated result that the number of registered items is zero, it proceeds to step S430.

In step S430, the circuit 115 notifies the user of the message that it is impossible to switch the user since the number of the registered items is zero. Specifically, the message is displayed on the display screen of the display device 109.

When the circuit 115 determines in step S4520 that the number of registered items is equal to or larger than one, it proceeds to step S440.

In step S440, the list of the registered user information and the information of the guest user (i.e., the guest information) are displayed.

Next, it proceeds to step S450. In step S450, the circuit 115 selects one of the user information or the guest information among the user information and the guest information (which are defined merely as user information), which are displayed in step S440, based on the input of the user (i.e., the driver). Here, a confirmation image for prompting the user to confirm the selected user information is also displayed on the display screen of the display device 109.

Next, it proceeds to step S460. In step S460, the circuit 115 determines based on the input of the user (i.e., the driver) whether the selection is confirmed. When the circuit 115 determines that a predetermined time has elapsed without confirmation (i.e., when time is up), it proceeds to step S590.

In step S590, the circuit 115 notifies the user (i.e., the driver) of the message that the user switching step is cancelled. Specifically, the circuit 115 notifies the user by displaying the message on the display screen of the display device 109.

When the circuit 115 determines in step S460 that the selection is confirmed, it proceeds to step S470.

In step S470, the circuit 115 determines whether information of mobile devices (such as a cell phone having Bluetooth function in this embodiment), which is connected to the selected (i.e., confirmed) user, is registered. When the circuit 115 determines that the information is not registered (i.e., when the determination of step S470 is "NO"), it proceeds to step S510.

When the circuit 115 determines in step S470 that the information of the mobile device is registered (i.e., when the determination of step S470 is "YES"), it proceeds to step S480.

In step S480, the registered mobile device connecting to the selected (i.e., confirmed) user is searched. Specifically, a calling signal is transmitted circumferentially.

Next, it proceeds to step S490. In step S490, the circuit 115 determines whether the mobile device is searched (i.e., whether a response signal corresponding to the calling signal is received). When the circuit 115 determines that the mobile device is searched (i.e., when the determination of step S490 is "YES"), it proceeds to step S500.

In step S500, connection (i.e., wireless communication) with the Bluetooth function is established. Thus, the recognition is completed (i.e., the process ends). Here, the recognized used information is displayed on the display screen of the display device 109 when the recognition is completed.

When the circuit 115 determines in step S490 that the mobile device is not searched (i.e., when the determination of step S490 is "NO"), it proceeds to step S510.

In step S510, the circuit 115 determines whether a password of the selected (i.e., confirmed) user is set. When the circuit 115 determines that the password is not set, (i.e., when the determination of step S510 is "NO"), the process ends.

When the circuit 115 determines that the password is set, (i.e., when the determination of step S510 is "YES"), it proceeds to step S520. In step S520, a password input image for prompting the user (i.e., the driver) of the input of the password is displayed on the display screen of the display device 109.

Next, it proceeds to step S530. Based on the input of the user (i.e., the driver), the circuit 115 determines whether the input of the password is cancelled. When the circuit determines that the input is cancelled (i.e., when the determination of step S530 is "YES"), it proceeds to step S590.

When the circuit 115 determines in step S530 that the input of the password is not cancelled (i.e., when the determination of step S530 is "NO"), it proceeds to step S540.

In step S540, the circuit 115 determines whether a predetermined time has elapsed since the user was confirmed (i.e., whether time is up). When the circuit 115 determines that the predetermined time has elapsed (i.e., when the determination of step S540 is "YES"), it proceeds to step S590.

In step S540, when the circuit 115 determines that the predetermined time has not elapsed since the user was confirmed (i.e., when the determination of step S540 is "NO"), it proceeds to step S550.

In step S550, the password is input based on the operation of the user (i.e., the driver).

Next, it proceeds to step S560. The circuit 115 determines whether the input password is proper. When the circuit 115 determines that the password is proper (i.e., when the determination of step S560 is "YES"), the recognition is completed (i.e., the process ends).

When the circuit 115 determines in step S560 that the password is not proper (i.e., when the determination of step S560 is "NO"), it proceeds to step S570.

In step S570, the circuit 115 determines whether the number of times that the circuit 115 determines the improper password is input exceeds a predetermined threshold. When the circuit 115 determines that the number of times exceeds the threshold (i.e., the determination of step S570 is "YES"), it proceeds to step S590.

In step S570, when the circuit 115 determines that the number of the determination times does not exceed the threshold (i.e., when the determination of step S570 is "YES"), it proceeds to step S580. In step S580, the message that the password is improper is notified to the user (i.e., the driver). Specifically, the message is displayed on the display screen of the display device 109 so that the message is notified to the driver. Then, it returns to step S520.

Here, as described above, the recognized user information is displayed when the recognition is completed. The recognized user information may be confirmed on a confirmation image for confirming the recognized user information.

Thus, when the user is switched, a new user as a switching object is identified.

Figure 8:
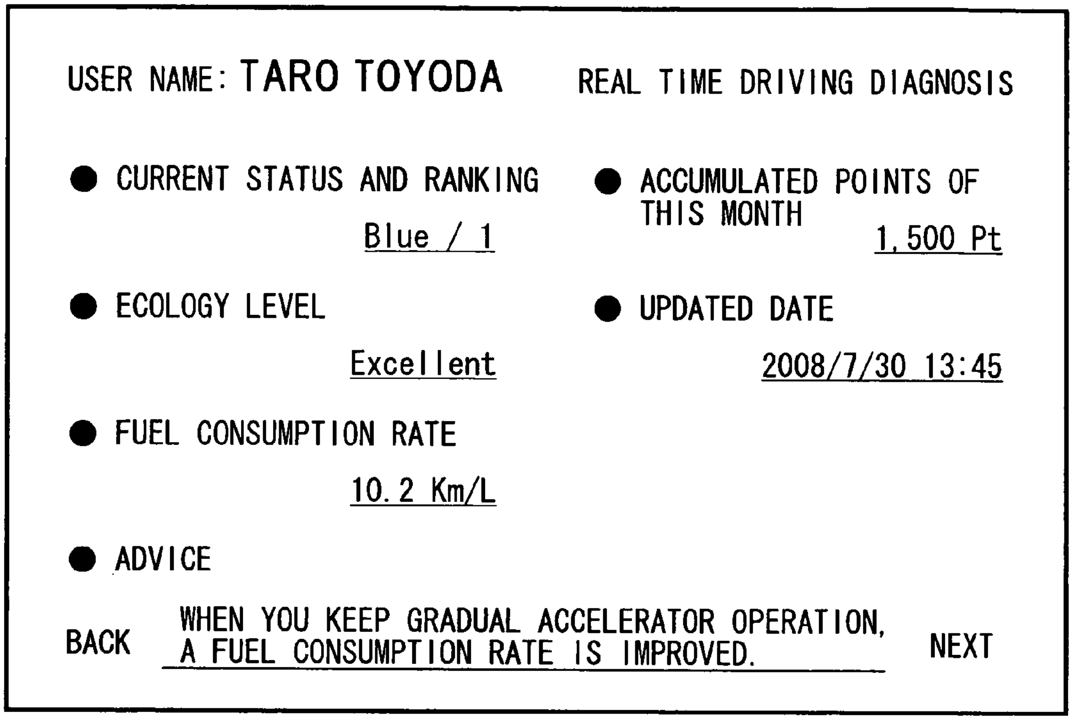
FIG. 8 is a diagram showing one example of a display screen of real time driving diagnosis.
Figure 9:
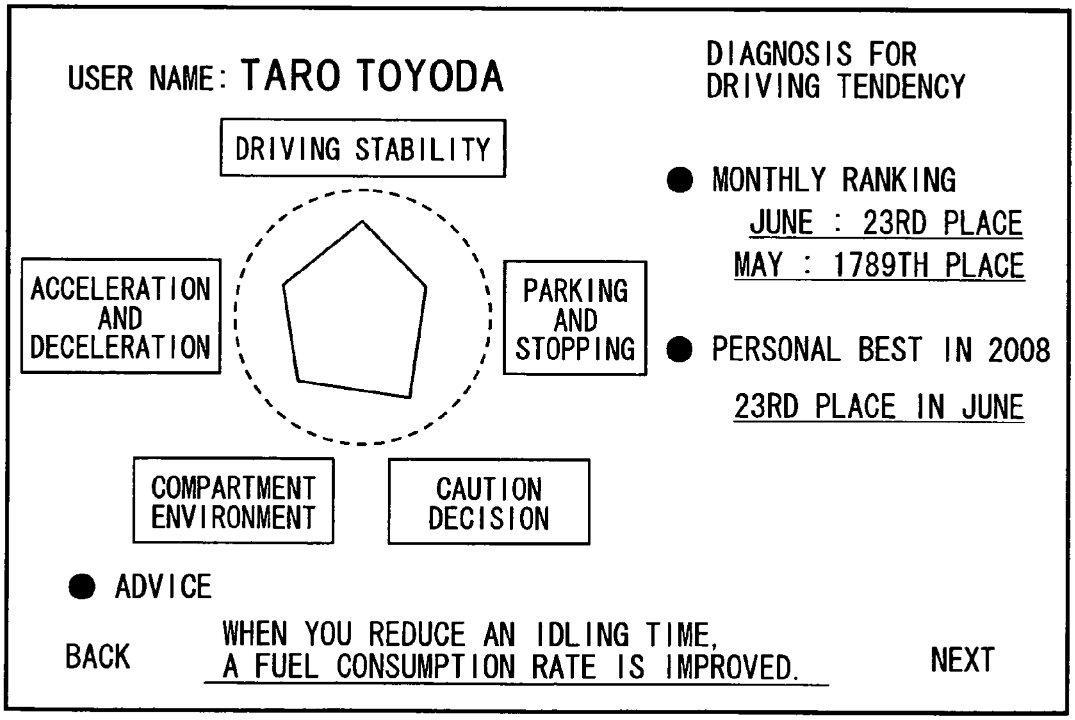
FIG. 9 is a diagrams showing one example of a display screen of driving tendency diagnosis.

FIGS. 8 and 9 are diagrams showing images (i.e., examples) of the diagnosis result, which is displayed on the display screen of the display device 109.

FIG. 8 is an example of the image showing the diagnosis result of the driving status, which is performed in real time. FIG. 9 is an example of the image showing the diagnosis result of driving tendency, which is diagnosed during a predetermined driving interval.

In the image of the real time driving diagnosis in FIG. 8, as described latter, at least status information, ecology level, fuel consumption information, accumulated points and advice are displayed.

The status information represents a class of a driving level and driving skill of the driver, which is color-coded. Here, the color of character display itself is color-coded according to the level. For example, gold color shows the most excellent level, silver color shows the second excellent level, and blue color shows the third excellent level.

The ecology level represents a degree of economic efficiency of driving. For example, the diagnosis results of fuel consumption rate, diagnosis for driving with turning on the ecology lamp, diagnosis for driving with using the ecology switch, diagnosis for usage of the air conditioner, diagnosis for driving with releasing the accelerator, and other diagnosis items are evaluated comprehensively, so that the level is decided. Further, the driver can set any evaluation period (i.e., term). For example, the driver can set the evaluation period to be one minute or a trip term (e.g., a term from time at which the accessory switch turns on to time at which the switch turns off).

Regarding the fuel consumption rate information, the fuel consumption rate at a certain time is displayed.

The accumulated points are total points, which is given to the driver at the present time. Here, the point may be available for various payments such as payment for shopping, payment for filling with gas, payment at a toll station of an expressway, or the like.

The advice is displayed appropriately according to the diagnosis result of the driving status. For example, when the circuit 115 determines that the acceleration operation is rough, the advice of "when you keep gradual acceleration operation, a fuel consumption rate is improved" is displayed. Thus, the advice prompts to improve the driving technique of the driver (i.e., the advice prompts economical driving and safety driving).

Next, as shown in FIG. 9, in the image showing the diagnosis result of the driving tendency, at least a radar chart, a ranking information and advice are displayed.

In the radar chart of the present example, score results of five diagnosis items such as driving stability, acceleration and deceleration, compartment environment, caution decision and parking and stopping are displayed.

Further, in the ranking information, the ranking of the accumulated points (shown in FIG. 8) is displayed in each month.

As described above; the advice is displayed appropriately according to the diagnosis result of the driving status (i.e., the diagnosis result of ye driving tendency).

Thus, in the present embodiment, multiple users are registered. Further, the diagnosis of the driving status is performed in each user by selecting or switching the user. Accordingly, each user can obtain the appropriate diagnosis result based on his driving skill. Further, in the present embodiment, the point is given to the driver (i.e., the point is accumulated) according to the diagnosis result.

Thus, the driving diagnosis system 1 and/or the driving diagnosis apparatus 10 handle multiple users, so that usability of them for the user is improved.

Further, in the present embodiment, the user is grouped and registered. Thus, the points to be given to the users can be aggregated into the group. For example, the points may be aggregated into a family group. Thus, the user can accumulate the points easily, and thereby, the points are effectively utilized. Thus, the apparatus meets a need of the user.

Here, the diagnosis of the driving status is performed in one trip term as a unit term. When the driving distance of the vehicle in the trip term is smaller than 1.6 kilometers (which is an average distance in case of short distance movement with using vehicles), the diagnosis result is not stored, and therefore, the point is not given. Accordingly, a case where the user uses the vehicle to get the point even in a short distance drive is limited. Specifically, the apparatus 10 prevent from promotion of waste of usage of the vehicle.

For example, if the point is given to the user since the driving status is excellent even when the vehicle is used for a short distance drive, the point is given, to the driving (i.e., the driving is favored), which is not preferable for environment since the vehicle is used for the short distance transfer. Thus, it is doubtful that the point system is valid. In view of this point, in the present embodiment, it is appropriate since the control circuit 115 determines based on the degree of contribution to the environment in addition to the excellent driving status whether the point is given.

In the present embodiment, when the user is switched, the recognition of the user is performed. Accordingly, for example, the system 1 prevents from illegal access of a third person to switch the user.

In the present embodiment, since the period, in which the vehicle information is not obtained normally, is removed from the diagnosis object, the accurate diagnosis result is obtained.

In the present embodiment, for example, when the selection of the user is not performed by accident, and after that, the selection (i.e., the identification) of the user is performed (i.e., when the user unidentified term exists), the user unidentified term is determined as the term, in which the after selected (after identified) user drives. Thus, the diagnosis result during the term, in which the user selection is not performed by accident, is also utilized, so that the diagnosis result becomes much accurate.

In the present embodiment, the vehicle I/F 113 corresponds to the obtaining means, the control circuit 115 and the process in step S130 correspond to the diagnosing means, the external memory 108 and processes in steps S180, S230 and S240 correspond to the diagnosis result recording means, the server 4 (specifically, function for calculating the point based on the diagnosis result) corresponds to the calculating means, the process for registering the user in FIGS. 3 and 4 corresponds to the registering means, the process for switching the user in FIGS. 3 and 4 and/or the process in FIG. 5 corresponds to the selecting and switching means, the process in steps S170 and S210 correspond to the determining means or the driving distance determining means, and the information input and anomaly detection element 155 corresponds to the anomaly determination means. The term from the accessory switch on to the accessory switch off (i.e., the term from the determination "YES" of step S110 to the determination "YES" of step S140), the term from the accessory switch on to the user switch (i.e., the term from the determination "YES" of the step S110 to the determination "YES" of the step S160), the term from the user switch (i.e., the time at which the driving distance is reset) to the accessory switch off (i.e., the term from step S190 to the determination "YES" of step S140), and the term from the user switch (i.e., the time at which the driving distance is reset) to the next user switch (i.e., the term from step S190 to, the determination "YES" of the step S160 via the determination "NO" of the step S140) correspond to the trip periods, respectively.

Although one of embodiments of the present invention is explained above, the present invention is not limited to the above embodiment, and thereby, the present invention may be applied to various embodiments within a technical scope of the present invention.

For example, in the above embodiment, the driving diagnosis apparatus 10 may have a function of the server 4. Specifically, the driving diagnosis apparatus 10 may calculate the point to be given to the driver of the vehicle based on the diagnosis result of the driving status of the vehicle, and further, based on the calculated point, the apparatus 10 may update the accumulated points of each driver. The point to be given to the driver and the accumulated points may be stored in the external memory 108. In this case, the external memory 108 corresponds to the calculation result recording means.

In FIG. 5 of the above embodiment, when the circuit 115 determines in step S420 that the number of registered items is zero (i.e., no registered item exists), the circuit 115 may recognize as the guest user.

When the circuit 115 determines in step S420 that the number of registered items is equal to or more than one, specifically, when the number of registered items is equal to or more than two, the user may be selected according to a predetermined priority. Alternatively, the user may be selected as the user, who is stored when the driving diagnosis apparatus 10 is turned off.

In the above embodiment, the user may decide whether the user information after recognition (i.e., recognized user information) is always displayed or not displayed when the driving diagnosis apparatus 10 is activated. For example, the control circuit 115 of the driving diagnosis apparatus 10 may execute a process in FIG. 10.

Figure 10:
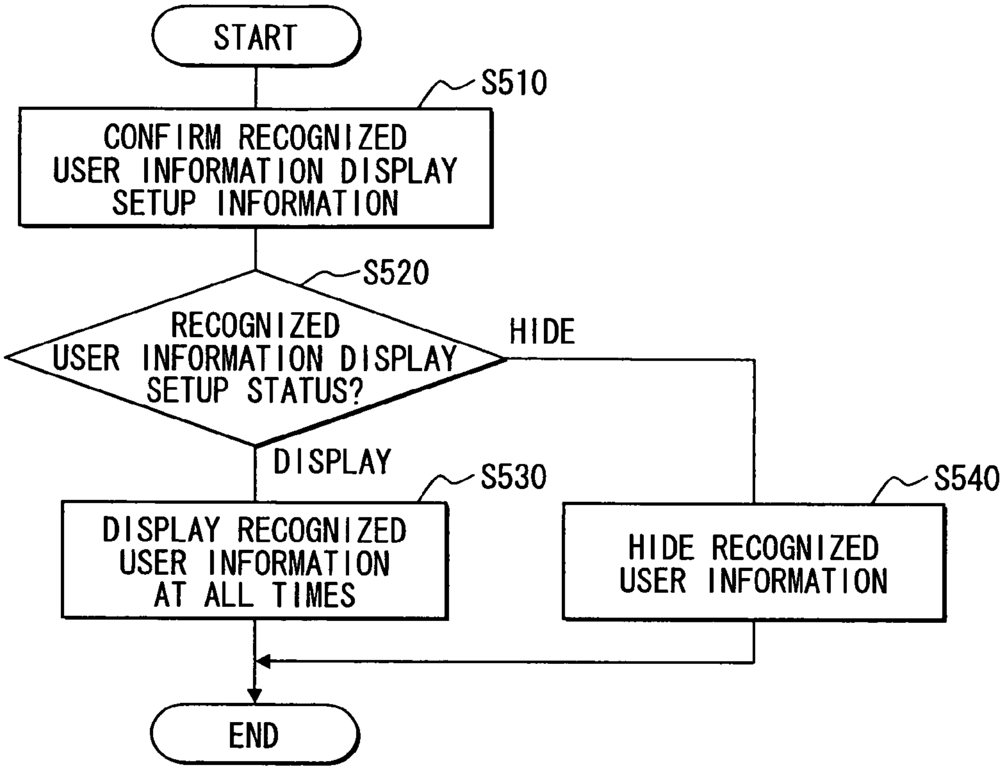
FIG. 10 is a flowchart showing recognized user information display setting process.

The circuit 115 starts to execute the process in FIG. 10 when the user turns on the accessory switch. First, in step S510, the recognized user information display setup information is confirmed. The recognized user information display setup is a setup for determining whether the recognized user information is always displayed or not displayed when the driving diagnosis apparatus 10 is activated. The user can set the recognized user information display setup freely.

In step S520 continued from step S510, the circuit 115 determines whether the setup status is a display status or a non-display status. When the circuit determines that the status is the display status, it proceeds to step S530. In step S530, the circuit 115 sets to display the recognized user information at all times. Then, the process ends.

When the circuit 115 determines in step S520 that the status is the non-display status, it proceeds to step S540. In step S540, the circuit 115 sets to hide the recognized user information. Then, the process ends.

In the above embodiment, an average fuel consumption rate in a predetermined period as the fuel consumption information in FIG. 8 may be displayed. Alternatively, transition of the fuel consumption rate in a predetermined period may be displayed as a graph.

The above disclosure has the following aspects.

According to a first aspect of the present disclosure, a driving diagnosis apparatus for a vehicle includes: an obtaining means for obtaining vehicle information that represents a vehicle condition; a diagnosing means for diagnosing driving status of the vehicle based on the vehicle information when the vehicle runs; a diagnosis result recording means for recording a diagnosis result of the diagnosing means; a calculating means for calculating a point to be given to a driver based on the diagnosis result; a calculation result recording means for recording a calculation result of the calculating means; a registering means for registering an user; a selecting and switching means for selecting and switching the user among registered users at least in the registering means; and a driving distance determining means for determining whether a driving distance during first to fourth trip periods in an on-off term is equal to or larger than a predetermined threshold. The on-off term is defined as a period from time at which an accessory switch of the vehicle turns on to time at which the switch turns off. The first trip period is defined as a period from time at which the accessory switch turns on to time at which the switch turns off when the user is not switched in the on-off term. The second trip period is defined as a period from user switching time to next user switching time when the user is switched twice or more in the on-off term. The third trip period is defined as a period from time at which the accessory switch turns on to first user switching time when the user is switched in the on-off term. The fourth trip period is defined as a period from last user switching time to time at which the accessory switch turns off when the user is switched in the on-off term. The diagnosis result recording means records the diagnosis result during one of the first to fourth trip periods in each user who is selected or switched by the selecting and switching means when the determining means determines in a determination process that the driving distance during the one of the first to fourth trip periods is equal to or larger than the threshold. The diagnosis result recording means does not record the diagnosis result during one of the first to fourth trip periods when the determining means determines in the determination process that the driving distance during the one of the first to fourth trip periods is not equal to or larger than the threshold. The calculation result recording means records the point as the calculation result of the calculating means in each user who is selected or switched by the selecting and switching means.

In the above apparatus, multiple users are registered by the registering means. By selecting and/or switching the user with using the selecting and switching means, diagnosis of the driving status in each user is performed. Further, the point according to the diagnosis result is given to each user (or, the points are accumulated in each user). Thus, the driving diagnosis apparatus handling multiple users is provided.

The diagnosis result recording means records the diagnosis result in each trip period, the result being obtained during one of the first to fourth trip periods. Here, one trip period is defined as a unit. When the driving distance of the vehicle during the one of the first to fourth trip periods is smaller than the predetermined threshold, the diagnosis result of the one of the first to fourth trip periods is not recorded. In this case, the diagnosis result is not recorded (i.e., the point is not given) when the user drives the vehicle for a short distance interval.

Accordingly, it is restricted to use the vehicle for a short distance in order to get the point. The apparatus prevents from promotion of waste of usage of the vehicle.

Alternatively, the selecting and switching means may recognize the user as a selecting object when the user is selected, and selects the user as the selecting object when recognition is successful. The selecting and switching means may recognizes a new user after switched when the user is switched, and selects the new user when recognition is successful.

A method of recognition may be, for example, a following method.

The recognition may be performed with using a vehicle key or a smart key. For example, it is determined whether the vehicle key or the smart key is legitimate (i.e., whether an ID provided in an electric wave transmitted from the vehicle key or the smart key as an electric key is proper). When the key is legitimate, the user (i.e., an owner of the vehicle) is recognized.

Alternatively, the recognition may be a method for recognizing based on input for selecting the user via a switch. For example, when a position of a seat and/or a position of a steering wheel are changed in each user so that the seat and the steering wheel are positioned to be a certain position, the user is identified and recognized based on the input of a switch for changing the positions.

Alternatively, the recognition may be a method for recognizing with using a mobile device (e.g., a cell phone) owned by the user. The apparatus couples with the mobile device with using a certain code. When the apparatus communicates with the mobile device, the apparatus determines that the recognition is successful.

Alternatively, the recognition may be a method for recognition with using a password. Specifically, the apparatus promotes the user to input a password, and determines whether the input password is proper. When the apparatus determines that the password is proper, the apparatus determines that the recognition is successful.

In the above driving diagnosis apparatus, the selection and switch of the user is not performed unless the recognition is successful. Thus, the apparatus prevents from illegal access of a third person to select or switch the user. Accordingly, the apparatus prevents from driving the vehicle under a condition that the user is selected or switched illegally. Further, the apparatus prevents from inaccurate accumulated information, which is caused by adding the information about the diagnosis result involuntarily.

Alternatively, the driving diagnosis apparatus may further include an anomaly determining means for determining anomaly of the obtaining means. The driving distance determining means may remove one of the first to fourth trip periods, in which the anomaly determining means determines anomaly of the obtaining means, and defines removed periods as new trip periods, so that the driving distance determining means executes the determination process with using the new trip periods.

In the above case, since the period, in which the vehicle information is not obtained because the obtaining means is abnormal, is not an object for diagnosis, the diagnosis result is accurate. Specifically, the apparatus executes proper diagnosis.

Alternatively, the diagnosis result recording means may determine whether the user is selected after one of the first to fourth trip periods when the user has not been selected in the one of the first to fourth trip periods. The diagnosis result recording means may record the diagnosis result in the one of the first to fourth trip periods in relation to the selected user when the diagnosis result recording means determines that the user is selected.

In the above case, for example, when the user forgets setup, and the user performs the setup after that, the diagnosis result during the interval, in which the user forgets the setup, is recorded as the diagnosis result of the user. Here, this action is performed based on a precondition that a possibility is high, the possibility that a driving host during a period in which the user has not been selected is the user who is set (i.e., identified) after the period in which the user has not been selected. Thus, the diagnosis result of the interval, in which the user forgets the setup by accident, is also utilized, so that the diagnosis result becomes much accurate. Here, for example, the user may selects whether the diagnosis result of the period in which the user forgets setup is utilized.

Alternatively, the registering means may register the user sorted into one of groups. The calculation result recording means aggregates the points in all users sorted into the one of groups, and records the aggregated points in each group, instead of recording the points in each user, when the user is sorted into the one of groups and registered.

In the above case, the points are aggregated into the same group (e.g., the same family), so that the apparatus provides service to meet a need of the user.

According to a second aspect of the present disclosure, a driving diagnosis system includes: an in-vehicle apparatus mounted on a vehicle; and a server configured to communicate with the in-vehicle apparatus. The in-vehicle apparatus includes: an obtaining means for obtaining vehicle information that represents a vehicle condition; a diagnosing means for diagnosing driving status of the vehicle based on the vehicle information when the vehicle runs; a diagnosis result recording means for recording a diagnosis result of the diagnosing means; and an in-vehicle apparatus side transmitting means for transmitting information about the diagnosis result recorded by the diagnosis result recording means to the server. The server includes: a calculating means for calculating a point to be given to a driver based on the information about the diagnosis result received from the in-vehicle apparatus; a calculation result recording means for recording a calculation result of the calculating means as the point; and a server side transmitting means for transmitting information about the calculation result recorded by the calculation result recording means to the in-vehicle apparatus. The in-vehicle apparatus further includes: a registering means for registering an user; a selecting and switching means for selecting and switching the user among registered users at least in the registering means; and a driving distance determining means for determining whether a driving distance during first to fourth trip periods in an on-off term is equal to or larger than a predetermined threshold. The on-off term is defined as a period from time at which an accessory switch of the vehicle turns on to time at which the switch turns off. The first trip period is defined as a period from time at which the accessory switch turns on to time at which the switch turns off when the user is not switched in the on-off term. The second trip period is defined as a period from user switching time to next user switching time when the user is switched twice or more in the on-off term. The third trip period is defined as a period from time at which the accessory switch turns on to first user switching time when the user is switched in the on-off term. The fourth trip period is defined as a period from last user switching time to time at which the accessory switch turns off when the user is switched in the on-off term. The diagnosis result recording means records the diagnosis result during one of the first to fourth trip periods in each user who is selected or switched by the selecting and switching means when the determining means determines in a determination process that the driving distance during the one of the first to fourth trip periods is equal to or larger than the threshold. The diagnosis result recording means does not record the diagnosis result during one of the first to fourth trip periods when the determining means determines in the determination process that the driving distance during the one of the first to fourth trip periods is not equal to or larger than the threshold. The calculation result recording means records the point as the calculation result of the calculating means in each user who is selected or switched by the selecting and switching means.

In the above system, diagnosis of the driving status in each user is performed. Further, the point according to the diagnosis result is given to each user (or, the points are accumulated in each user). Thus, the driving diagnosis system handling multiple users is provided. Further, it is restricted to use the vehicle for a short distance in order to get the point. The apparatus prevents from promotion of waste of usage of the vehicle.

Alternatively, according to a modification of the above embodiments, a driving diagnosis apparatus includes: an obtaining means for obtaining vehicle information that represents a vehicle condition; a diagnosing means for diagnosing driving status of the vehicle based on the vehicle information obtained by the obtaining means when the vehicle runs; a diagnosis result recording means for recording a diagnosis result of the diagnosing means; a calculating means for calculating a point to be given to a driver based on the diagnosis result recorded by the diagnosis result recording means; a calculation result recording means for recording a calculation result of the calculating means; and a registering means for registering an user; a selecting and switching means for selecting and switching the user among registered users at least in the registering means. The diagnosis result recording means records the diagnosis result of each user, which is selected and/or switched by the selecting and switching means. The calculation result recording means records the calculation result of the calculating means as the point of each user, which is selected and/or switched by the selecting and switching means.

The above driving diagnosis apparatus provides to handle multiple users. Specifically, the apparatus diagnoses each user, and gives the point to each user based on the diagnosis result of a respective user. Thus, each user can accumulate the point based on his driving status.

Alternatively, according to another modification of the above embodiments, a driving diagnosis apparatus includes: an obtaining means for obtaining vehicle information that represents a vehicle condition; a diagnosing means for diagnosing driving status of the vehicle based on the vehicle information obtained by the obtaining means when the vehicle runs; a diagnosis result recording means for recording a diagnosis result of the diagnosing means; a calculating means for calculating a point to be given to a driver based on the diagnosis result recorded by the diagnosis result recording means; a calculation result recording means for recording a calculation result of the calculating means; and a driving distance determining means for determining whether a driving distance during (1) first to (4) fourth trip periods in an on-off term is equal to or larger than a predetermined threshold. The on-off term is defined as a period from time at which an accessory switch of the vehicle turns on to time at which the switch turns off. The first trip period (1) is defined as a period from time at which the accessory switch turns on to time at which the switch turns off when the user is not switched in the on-off term. The second trip period (2) is defined as a period from user switching time to next user switching time when the user is switched twice or more in the on-off term. The third trip period (3) is defined as a period from time at which the accessory switch turns on to first user switching time when the user is switched in the on-off term. The fourth trip period (4) is defined as a period from last user switching time to time at which the accessory switch turns off when the user is switched in the on-off term. The diagnosis result recording means records the diagnosis result during one of the first to fourth trip periods when the determining means determines in a determination process that the driving distance during the one of the first to fourth trip periods is equal to or larger than the threshold. The diagnosis result recording means does not record the diagnosis result during one of the first to fourth trip periods when the determining means determines in the determination process that the driving distance during the one of the first to fourth trip periods is not equal to or larger than the threshold.

The above apparatus does not record the diagnosis result (i.e., the apparatus does not give the point) when the vehicle runs for a short distance interval. Accordingly, it is restricted to use the vehicle for a short distance in order to get the point. The apparatus prevents from promotion of waste of usage of the vehicle.

While example embodiments have been described above, it is to be understood that the invention is not limited to the example embodiments and constructions. The invention is intended to cover various modification and equivalent arrangements. In addition, while the various combinations and configurations, which are exemplary, other combinations and configurations, including more, less or only a single element, are also within the spirit and scope of the invention.

The invention claimed is:

1. A driving diagnosis apparatus for a vehicle comprising:

an obtaining means for obtaining vehicle information that represents a vehicle condition;

a diagnosing means for diagnosing driving status of the vehicle based on the vehicle information when the vehicle runs;

a diagnosis result recording means for recording a diagnosis result of the diagnosing means;

a calculating means for calculating a point to be given to a driver based on the diagnosis result;

a calculation result recording means for recording a calculation result of the calculating means;

a registering means for registering an user;

a selecting and switching means for selecting and switching the user among registered users at least in the registering means; and a driving distance determining means for determining whether a driving distance during first to fourth trip periods in an on-off term is equal to or larger than a predetermined threshold, wherein the on-off term is defined as a period from time at which an accessory switch of the vehicle turns on to time at which the switch turns off, the first trip period is defined as a period from time at which the accessory switch turns on to time at which the switch turns off when the user is not switched in the on-off term, the second trip period is defined as a period from user switching time to next user switching time when the user is switched twice or more in the on-off term, the third trip period is defined as a period from time at which the accessory switch turns on to first user switching time when the user is switched in the on-off term, the fourth trip period is defined as a period from last user switching time to time at which the accessory switch turns off when the user is switched in the on-off term, the diagnosis result recording means records the diagnosis result during one of the first to fourth trip periods in each user who is selected or switched by the selecting and switching means when the determining means determines in a determination process that the driving distance during the one of the first to fourth trip periods is equal to or larger than the threshold, the diagnosis result recording means does not record the diagnosis result during one of the first to fourth trip periods when the determining means determines in the determination process that the driving distance during the one of the first to fourth trip periods is not equal to or larger than the threshold, and the calculation result recording means records the point as the calculation result of the calculating means in each user who is selected or switched by the selecting and switching means.

2. The driving diagnosis apparatus according to claim 1, wherein the selecting and switching means recognizes the user as a selecting object when the user is selected, and selects the user as the selecting object when recognition is successful, and wherein the selecting and switching means recognizes a new user after switched when the user is switched, and selects the new user when recognition is successful.

3. The driving diagnosis apparatus according to claim 1, further comprising:

an anomaly determining means for determining anomaly of the obtaining means, wherein the driving distance determining means removes one of the first to fourth trip periods, in which the anomaly determining means determines anomaly of the obtaining means, and defines removed periods as new trip periods, so that the driving distance determining means executes the determination process with using the new trip periods.

4. The driving diagnosis apparatus according to claim 1, wherein the diagnosis result recording means determines whether the user is selected after one of the first to fourth trip periods when the user has not been selected in the one of the first to fourth trip periods, and wherein the diagnosis result recording means records the diagnosis result in the one of the first to fourth trip periods in relation to the selected user when the diagnosis result recording means determines that the user is selected.

5. The driving diagnosis apparatus according to claim 1, wherein the registering means registers the user sorted into one of groups, wherein the calculation result recording means aggregates the points in all users sorted into the one of groups, and records the aggregated points in each group, instead of recording the points in each user, when the user is sorted into one of groups and registered.

6. A driving diagnosis system comprising:

an in-vehicle apparatus mounted on a vehicle; and a server configured to communicate with the in-vehicle apparatus, wherein the in-vehicle apparatus includes:

an obtaining means for obtaining vehicle information that represents a vehicle condition;

a diagnosing means for diagnosing driving status of the vehicle based on the vehicle information when the vehicle runs;

a diagnosis result recording means for recording a diagnosis result of the diagnosing means; and an in-vehicle apparatus side transmitting means for transmitting information about the diagnosis result recorded by the diagnosis result recording means to the server, wherein the server includes:

a calculating means for calculating a point to be given to a driver based on the information about the diagnosis result received from the in-vehicle apparatus;

a calculation result recording means for recording a calculation result of the calculating means as the point; and a server side transmitting means for transmitting information about the calculation result recorded by the calculation result recording means to the in-vehicle apparatus, wherein the in-vehicle apparatus further includes;

a registering means for registering an user;

a selecting and switching means for selecting and switching the user among registered users at least in the registering means; and a driving distance determining means for determining whether a driving distance during first to fourth trip periods in an on-off term is equal to or larger than a predetermined threshold, wherein the on-off term is defined as a period from time at which an accessory switch of the vehicle turns on to time at which the switch turns off, wherein the first trip period is defined as a period from time at which the accessory switch turns on to time at which the switch turns off when the user is not switched in the on-off term, wherein the second trip period is defined as a period from user switching time to next user switching time when the user is switched twice or more in the on-off term, wherein the third trip period is defined as a period from time at which the accessory switch turns on to first user switching time when the user is switched in the on-off term, wherein the fourth trip period is defined as a period from last user switching time to time at which the accessory switch turns off when the user is switched in the on-off term, wherein the diagnosis result recording means records the diagnosis result during one of the first to fourth trip periods in each user who is selected or switched by the selecting and switching means when the determining means determines in a determination process that the driving distance during the one of the first to fourth trip periods is equal to or larger than the threshold, wherein the diagnosis result recording means does not record the diagnosis result during one of the first to fourth trip periods when the determining means determines in the determination process that the driving distance during the one of the first to fourth trip periods is not equal to or larger than the threshold, and wherein the calculation result recording means records the point as the calculation result of the calculating means in each user who is selected or switched by the selecting and switching means.

* * * * *